United States Patent [19]

Starr et al.

[11] 4,019,651

[45] Apr. 26, 1977

[54] SEED PLANTER WITH A SUCTION PICKUP MECHANISM

[75] Inventors: George N. Starr, Memphis, Tenn.; Boyd C. Robertson, Jr., Jonesboro, Ark.

[73] Assignee: Floyd R. Bridger, Jr., Jonesboro, Ark.

[22] Filed: Sept. 19, 1975

[21] Appl. No.: 615,174

[52] U.S. Cl. .............................. 221/211; 221/237; 221/278; 111/77

[51] Int. Cl.² ......................................... A01C 7/04

[58] Field of Search .......... 221/200, 211, 237, 278; 111/77, 78; 222/194; 302/31, 48

[56] References Cited

UNITED STATES PATENTS

| | | | |
|---|---|---|---|
| 2,325,665 | 8/1943 | Cox | 221/211 X |
| 3,223,288 | 12/1965 | Stern | 222/194 |
| 3,240,175 | 3/1966 | Clow | 221/211 X |
| 3,380,626 | 4/1968 | Giannini | 221/200 |
| 3,788,518 | 1/1974 | Beebe | 221/211 |
| 3,849,041 | 11/1974 | Knapp | 221/278 X |

*Primary Examiner*—Robert B. Reeves
*Assistant Examiner*—Francis J. Bartuska
*Attorney, Agent, or Firm*—John R. Walker, III

[57] ABSTRACT

A seed pickup mechanism for a vacuum wheel type seed planter including provision for arranging the seeds into a relatively thin stable seedbed which is suitably carried through a seed pickup chamber at a spaced distance below the vacuum wheel. The stable seedbed is converted into an unstable or fluidal state as it passes through the seed pickup chamber by an upwardly directed blast of air which is effective to expand the seedbed or slightly lift and separate the seeds thus the seeds are raised upwardly to facilitate engagement thereof with the vacuum wheel.

11 Claims, 6 Drawing Figures

SEED PLANTER WITH A SUCTION PICKUP MECHANISM

BACKGROUND OF THE DISCLOSURE

1. Field of the Invention:

This invention relates to the field of seed planters and is particularly directed toward seed planters of the type incorporating a suction pump in conjunction with the seed pickup mechanism.

2. Description of the Prior Art:

The type planter which accounts for most of those in use today is known as the plate type which operates as follows. The frame of the planter is attached by suitable means to a tractor or the like and riding on a press wheel is thus drawn over the ground. A plowshare opens a furrow into which seeds coming through a drop tube fall. The rim of the press wheel being of cross section suitable for accomplishing some causes the furrow to be closed over the seeds and thus the planting process is completed.

It becomes immediately obvious that some means must be provided to select and drop individual seeds at regular intervals in order that not only will the plants be at the desired spacing but that there will be but one plant per space inasmuch as two or more seeds at the same location will result in inferior growth and development. The plate type planter accomplishes this task by means of a rotating plate which has a series of holes disposed about its rim. Seeds contained in the hopper will find their way into these pockets as the plate rotates. As the pockets pass under a shelflike ledge, they are isolated from the rest of the hopper allowing the seeds to fall through the drop tube and into the ground. Power to drive the plate is obtained by coupling the plate through its drive shaft to a set of bevel gears which in turn are driven by means of a chain and sprocket drive which will transmit torque generated by the press wheel as the unit is pulled across the ground.

The disadvantages of the above system are many but resolve themselves into two general categories which are: (1) poor performance in selecting individual seeds and (2) damage to seeds thus preventing germination. More specifically, the ability of this system to select an individual seed is dependent entirely on a good match between seed size and pocket size. This requires that the operator have available to him a selection of plates so as to be able to match size and shape of seed to plate. It follows that regardless of plate availability, satisfactory results will not be obtained unless the seeds are of reasonably uniform size and shape. Such seed is available but at cost premiums varying directly with size consistency.

If a seed is oversize or if it happens to seat in the pocket improperly or if two seeds are lodged in the same pocket, the possibility exists of crushing these seeds as the plate moves under the shelflike ledge, which is the second major disadvantage of this system. Germination of some seeds, peanuts in particular, will not take place if the seeds are even slightly bruised.

Vacuum wheel type seed planters overcome the disadvantages of the plate type in that once the seed has been picked up by the wheel it does not have to come in contact with any other part of the machine until it is dropped and will thus be much less subject to damage. Furthermore, one size of vacuum port will idealistically handle quite a wide range of seed sizes and shapes and hopefully grading should become unnecessary resulting in a savings in seed cost. The principle of vacuum seed selection and handling is not new, there having been several units placed on the market in recent years. They have not, however, been large successes because of several problems which seem to manifest themselves in a failure of each port to pick up and discharge a seed on each revolution of the vacuum wheel with necessary or acceptable consistency. The following are some of the problems which result in erratic or inconsistent performance of the prior vacuum wheel seed planters.

1. Failure to maintain negative pressure within the vacuum wheel to a degree which will cause seed to adhere to port until reaching the drop point.

2. Improper surface configuration in and around port opening. In other words, for maximum holding power, the ideal situation would be for the seed to completely block the port to which it is being held. To the extent that this is not done, holding power is commensurately reduced. The seeds at best are irregular spheroids and at worst may even have convoluted surfaces making good contact between seed and port difficult.

3. Blockage of the nozzles or ports by foreign matter. Obviously, seed stock is going to contain a percentage of foreign matter, consisting of leaves, stalks, husks, broken seed, etc. These materials can be sufficiently small to where they can become lodged in the nozzle or port which renders it inoperative thus causing a skip in the planting pattern.

4. Failure of seed to drop off the wheel at the desired drop point. This problem also causes a skip in the planting pattern.

5. Seeds being stripped off by other seeds as the wheel withdraws from the bed of seeds. In most vacuum wheel systems, the wheel dips into or runs partially submerged in a bed of seeds. That the nozzles come into intimate contact with the seeds there can be no doubt and pick up should be positive. Unfortunately, as a particular seed is withdrawn it can be seen that the possibility exists that it can be stripped off by wiping action or interference from other seeds and there can be no assurance that another seed will be picked up before that particular nozzle is too far from the bed to accomplish same.

Various approaches or solutions to problems have heretofore been made for certain of the above-mentioned problems, a few of which are: first, the U.S. Patent to Clow, No. 3,240,175 incorporates ramlike structure directed towards solving blockage of the nozzles by foreign matter. Clow approaches this problem by incorporating hollow needles as pickup orifices and provides means for cleaning the inside of each needle during the operation.

A second solution concerns failure of the seed to drop off the wheel at the desired point. One solution to this problem was approached by a U.S. Patent to Anderson No. 2,737,314 which incorporates an air jet to blast the seeds from the pickup mechanism. Specifically, the device according to the '314 patent has the suction engaged seeds riding upwardly with rotation of the seed pickup mechanism. They subsequently pass between a nozzle and a funnel where an air jet or blast from the nozzle drives each seed free of the pickup mechanism and directs it into the funnel.

A third solution concerns the seeds being stripped off by other seeds as the wheel withdraws from the bed of seeds. Anderson possibly was aware of this problem since the above-mentioned Anderson '314 patent teaches liquid fluidization of the seeds. Although, this problem was not stated in this patent, the structure incorporated therewith inherently alleviates this problem. More specifically, the '314 patent includes an open topped tank which carries a quantity of water and the seeds, being germinated, remain sunk in the water. The seed pickup mechanism reaches into the bottom of the tank to engage and pick up a seed. Since the seeds are submerged in water and have a certain amount of buoyancy, they do not have the capability of stripping the picked up seed from the pickup mechanism. It should be mentioned that none of the above patents suggest or disclose applicant's device.

SUMMARY OF THE INVENTION

The present invention is directed toward overcoming the disadvantages and problems relative to previous seed planters. More particularly, and with respect to the first of the above-mentioned problems, a single point lip seal preferably is used in conjunction with a hollow shaft to achieve a rotary connection of vacuum line to vacuum wheel. This arrangement results in only one sealing point and furthermore seals at a point of relatively small diameter yielding a lower surface speed between rotating and stationary parts which will result in longer seal life and indeed more effective sealing.

Additionally, and in order to overcome the second of the above-mentioned problems, the present invention includes structure which reduces the port in the nozzle to the smallest possible size, e.g., 0.080 inches in diameter or 2.032 mm. in the case of field corn; or 0.031 inches in diameter or 0.79 mm., in the case of sugar beets, which will still result in sufficient pressure differential to hold the seed in place. In other words, considerably less holding force is necessary since the problem of seeds being stripped off by other seeds is eliminated in a manner yet to be disclosed. The reason for reducing the port to its smallest size is because there is a greater likelihood of finding a small regular area on the average seed than there is to find a large regular area. Second, the nozzle face has been flared back at an angle of approximately 30° such that the flat area surrounding the port is held to a minimum. This enables the vacuum wheel to pick up not only spheroids but may even allow the nozzle to attach to a seed in a concave section of a convoluted surface. This is not possible with vacuum wheels which have a typical flat surface surrounding the vacuum port.

The third of the above-mentioned problems which pertains to blockage of the nozzles is overcome or solved by first counterboring the nozzle from the rear or suction side to the extent that the smallest cross-sectional area exists for the shortest possible length and then opens to something larger. From this point on all passages are progressively larger so that if a particle passes through the sized orifice it will not have a tendency to lodge anywhere in the system save the intake filter on the vacuum blower where it can cause no problems. Additionally, each nozzle has its outer surface wiped each revolution with fairly strong pressure by a wiper lip which is made from elastomeric material of sufficient hardness so as to either shear off or shove through any object lodged in the nozzle. If the object is sheared off, the planter incorporates sufficient negative pressure to pull it through and thus clear the nozzle. On the other hand, large objects simply covering the part will be easily cleared by the wiper.

The fourth of the above-mentioned problems or failure of the seed to drop off the wheel at the desired point is solved by the present invention by incorporating means for cyclically blocking the ports in the segment of the wheel wherein release is desired. In other words, a spring-loaded self lubricating plastic block, e.g., a Teflon block or the like, presses against the inside rim of the vacuum wheel and is keyed to a stationary shaft and therefore as ports in the wheel pass in this vicinity they are blocked, shutting off the vacuum which allows the seeds to fall from the wheel into the drop chute. If for some reason the seed does not drop it will be stripped off by the wiper thus insuring substantially 100% drop and uniformly distributed plants.

The fifth of the above-mentioned problems or the problem of the seeds being stripped off by other seeds as the wheel withdraws from the bed of seeds is solved by the instant invention in a most unusual manner. More specifically, rather than have the wheel merely running in and out of the bottom of a hopper, a rotary table feeder is incorporated to remove the seed from the hopper initially. The rotary table feeder or circular trough is driven under the hopper for arranging the seeds intended to be planted into a relatively thin layer thus establishing a stable seedbed. Also included is a seed pickup chamber and means for carrying the seedbed through the seed pickup chamber at a spaced distance below the vacuum wheel, i.e., the wheel does not dip into or run partially submerged in the bed of seeds. Also included are means for expanding the seedbed whereby the density of the seedbed is decreased resulting in an increased thickness of the seedbed while it passes through the seed pickup chamber thus lifting the seeds upwardly for engagement with the vacuum wheel. More specifically, the means for expanding the seedbed includes a source of air under pressure which is communicated with the seed pickup chamber in such a manner that it is effective to slightly lift and separate the seeds whereby an unstable or fluidal state exists within the seedbed as it passes through the seed pickup chamber. Therefore, instead of the wheel having to dip into the seedbed it runs slightly above the static level of the seeds. Since the seeds are no longer at rest and packed down, the withdrawal of a seed from the bed can be accomplished without its being stripped by other seeds through which it must be dragged. The aerated seeds will easily move aside as the selected seed is withdrawn. Aeration of small seeds such as popcorn is easily accomplished and bed depth is not critical. Larger seeds such as lima beans and peanuts must be struck off at a lower level so that air pressure requirements sufficient to cause seed movement do not become excessive. Therefore, the present invention includes means for adjusting the seed planter for the planting of popcorn, lima beans, peanuts and the like.

DESCRIPTION OF THE PREFERRED EMBODIMENT

Figure 1:
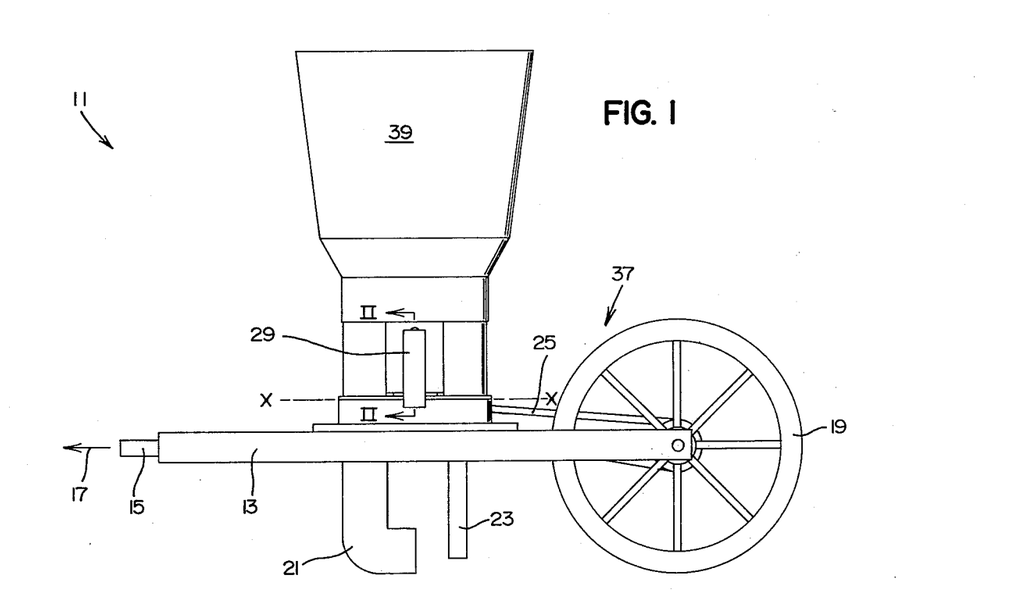
FIG. 1 is a side elevational view of the seed planter of the present invention.

From FIG. 1 of the drawings it may clearly be seen that the seed planter 11 of the present invention in general closely resembles prior seed planters. In fact, one intent of the present invention is to provide structure for readily adapting the inventive structure of the present invention with prior seed planters. Therefore, the seed planter of the present invention will incorporate all of the usual well-known structure shown in FIG. 1 below the line X—X. Therefore, it should be sufficient to simply state that the seed planter 11 is adaptable to the plate type seed planter which includes a frame 13 which is attached by suitable hitch structure, as at 15, to a tractor (not shown) which pulls the seed planter 11 in the direction of an arrow 17. The seed planter 11 is rigidly supported on a press wheel 19 and is thus drawn over the ground. A plowshare 21 opens a furrow (not shown) into which seeds coming through a drop tube 23 fall. The rim of the wheel 19 is of suitable cross section for causing the furrow to be closed over the seeds and thus the planting process is completed. Additionally, the press wheel 19 drives an endless chain 25 which in turn (through a pair of bevel gears, not shown, or the like) rotatably drives a shaft 27 about a vertical axis, the shaft 27 is clearly shown in FIG. 2 of the drawings.

Further, the seed planter 11 is of the type incorporating a well-known suction pump 29 in conjunction with peculiar seed pickup mechanism 31 which will be fully disclosed as the specification proceeds. It should be understood that the suction pump 29 may be powered in any convenient well-known manner, e.g., by an auxiliary internal combustion engine or by the tractor engine, etc. Additionally, the suction pump 29 includes an inlet or suction conduit 33 and an outlet or air pressure conduit 35 which conveniently provides a source of air under pressure for purposes yet to be disclosed. Further, certain of the above-mentioned structures, e.g., the press wheel 19, the endless chain 25, and the shaft 27 etc., may hereinafter optionally be referred to as ground engaging drive means 37 which is operable in a conventional manner by pulling the seed planter 11 along over the ground.

Figure 2:
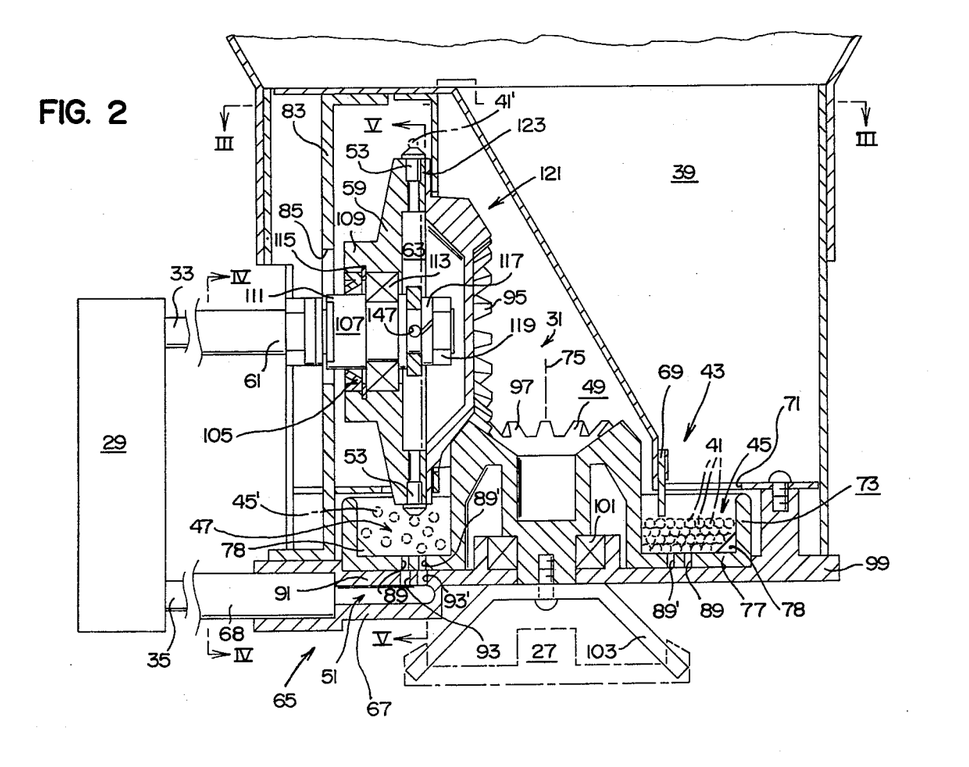
FIG. 2 is a sectional view taken as on the line II—II of FIG. 1 showing a plurality of seeds arranged into a relatively thin layer or seedbed with the seedbed being shown expanded while it passes through a seed pickup chamber.

Particular attention is now directed to FIG. 2 of the drawings wherein it may be seen that the seed planter 11 includes a hopper 39 for containing a given supply of the seeds such as popcorn, soybeans, etc., intended to be planted, i.e., the seeds being individually character referenced by the numeral 41. Included therewith are dispensing means, as at 43 for dispensing from the hopper 39 a layer of the seeds 41 thus establishing a stable seedbed 45 having a predetermined thickness or height. Additionally, seed pickup chamber 47 is disposed adjacent the dispensing means 43. Also included are means, as at 49, coupled to the ground engaging drive means 37 for carrying the seedbed 45 through the seed pickup chamber 47, in a manner to be fully disclosed as the specification proceeds. Also included are means, as at 51, for expanding the seedbed whereby the density of the seedbed is decreased resulting in an increased thickness or height of the seedbed, as at 45', while it passes through the seed pickup chamber, in a manner which will be fully disclosed as the specification proceeds. Thus it should be sufficient to simply state at this time that the means 51 for expanding the seedbed 45' effectively lifts the seeds 41 upwardly for engagement with certain structure associated with the suction conduit 33 and to be fully disclosed as the specification proceeds.

Figure 4:
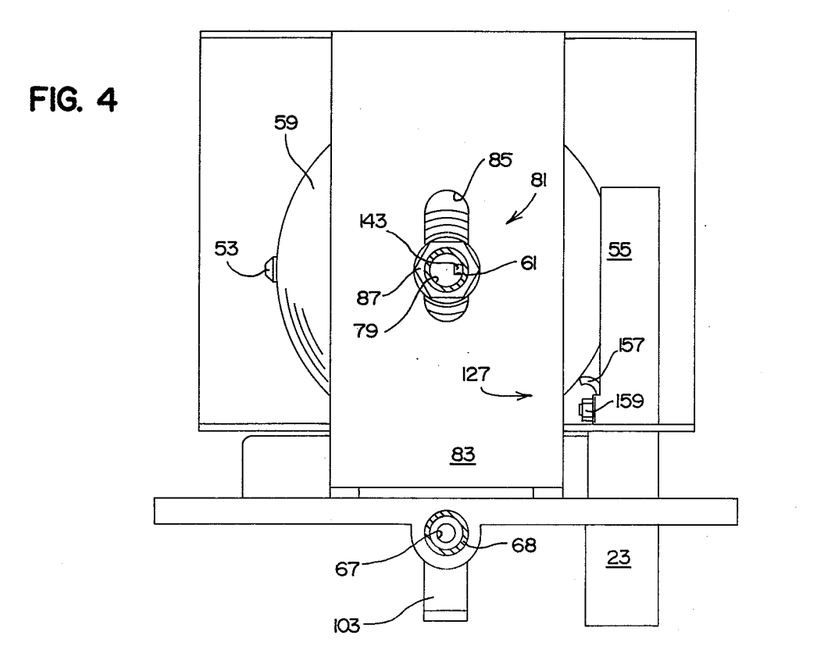
FIG. 4 is a sectional view taken as on the line IV—IV of FIG. 2.
Figure 5:
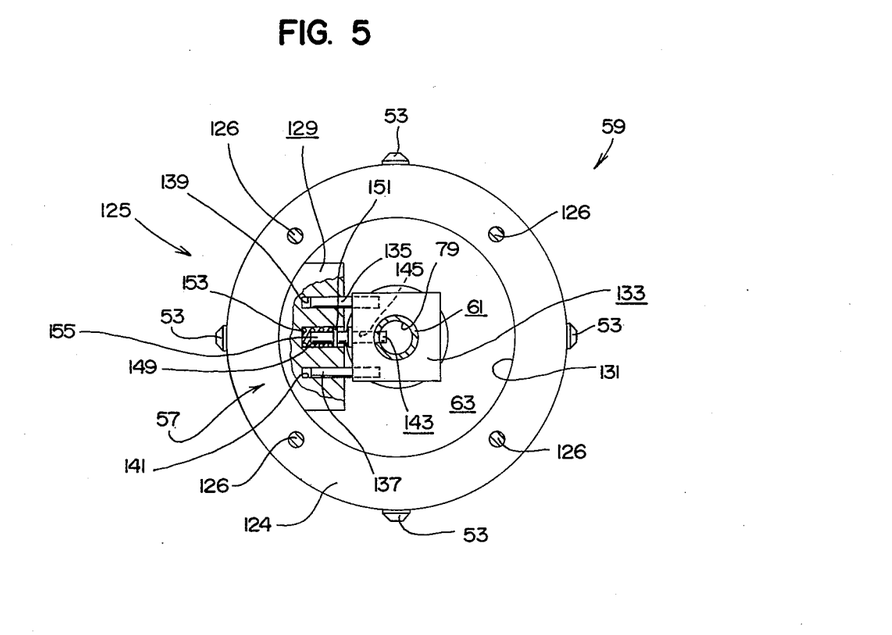
FIG. 5 is a sectional view taken as on the line V—V of FIG. 2.
Figure 6:
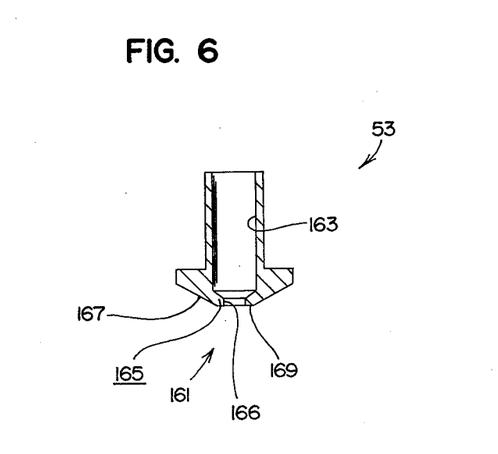
FIG. 6 is a sectional view of one of the nozzles for picking up seeds, the cut being taken through the vertical center line of the nozzle.

The seed pickup mechanism 31 includes at least one nozzle means 53 best shown in FIGS. 5 and 6 of the drawings, coupled to the ground engaging drive means and being communicated with the suction pump 29 for repeatedly withdrawing one seed 41 at a time from the expanded seedbed 45'. The nozzle means 53 is cyclically moved into the seed pickup chamber 47 at a spaced distance above the stable seedbed 45 thence to a seed discharge zone, as at 55 in FIGS. 3, 4, in a manner to be fully disclosed later in the specification. Also included are means, as at 57 in FIG. 5, for releasing the seeds 41 from the nozzle means 53 as the nozzle means 53 enters the seed discharge zone 55 (FIGS. 3, 4) thus enabling the seeds 41 to subsequently gravitate to the ground at predetermined spaced apart intervals, i.e., the seed discharge zone 55 being disposed above and communicated with the drop tube 23 as clearly shown in FIG. 5 of the drawings.

It should be pointed out that the seed pickup mechanism includes a hollow wheel or a vacuum wheel 59 (FIGS. 2–5) driven about a horizontally disposed shaft 61 and the nozzle means 53, being directed outwardly from the circumference of the wheel 59, is fixedly attached thereto for movement into the seed pickup chamber 47 thence to the seed discharge zone 55 as the wheel 59 rotates, i.e., the hollow interior, as at 63 in FIGS. 2, 5, of the wheel 59 is communicated with the nozzle means 53 and the suction pump 29 whereby the air being moved by the suction pump 29 rushes inwardly through the nozzle means 53 thus effecting the seed withdrawal by causing one of the seeds, as at 41', to be pulled firmly against the nozzle means 53.

Stated another way, the seed pickup mechanism 31 includes means, e.g., the dispensing means 43, for arranging the seeds 41 intended to be planted into a relatively thin layer thus establishing the seedbed 45, a seed pickup chamber 47, means 49 (previously mentioned) for carrying the seedbed 45 through the seed pickup chamber 47 at a spaced distance below the vacuum wheel 59, and means 51 (previously mentioned) for expanding the seedbed 45 whereby the density of the seedbed is decreased resulting in an increased thickness of the seedbed, e.g., as at 45', while it passes through the seed pickup chamber 47 thus lifting the seeds 41' upwardly for engagement with the vacuum wheel 59.

From FIG. 2 is may also be seen that the means 51 for expanding the seedbed 45 includes a source of air under pressure, e.g., such as that emanating from the outlet 35, and means, as at 65, for communicating the seed pickup chamber 47 with the source of air under pressure 35 which is effective to slightly lift and separate the seeds 41 whereby an unstable or fluidal state exists within the seedbed 45' as it passes through the seed pickup chamber 47. The means 65 for communicating the seed pickup chamber 47 with the source of air pressure 35 includes a manifold 67 having suitable conduit, as at 68, for communicating the manifold 67 with the source of air pressure 35.

From FIG. 2 of the drawings it may also be seen that the seed planter 11 includes means, e.g., a striker bar 69 frictionally supported within a mouthlike opening 71 provided in the floor area of the hopper 39. The striker bar 62 is free to move to various positions along a vertical plane for selectively varying the thickness or height of the stable seedbed 45 whereby an optimum thickness thereof may be obtained for various different type, size and weight of seeds, i.e., according to preselected standards established by suitable experimentation intended to be provided as operating instructions for the seed planter 11 and which are not included herewith.

Figure 3:
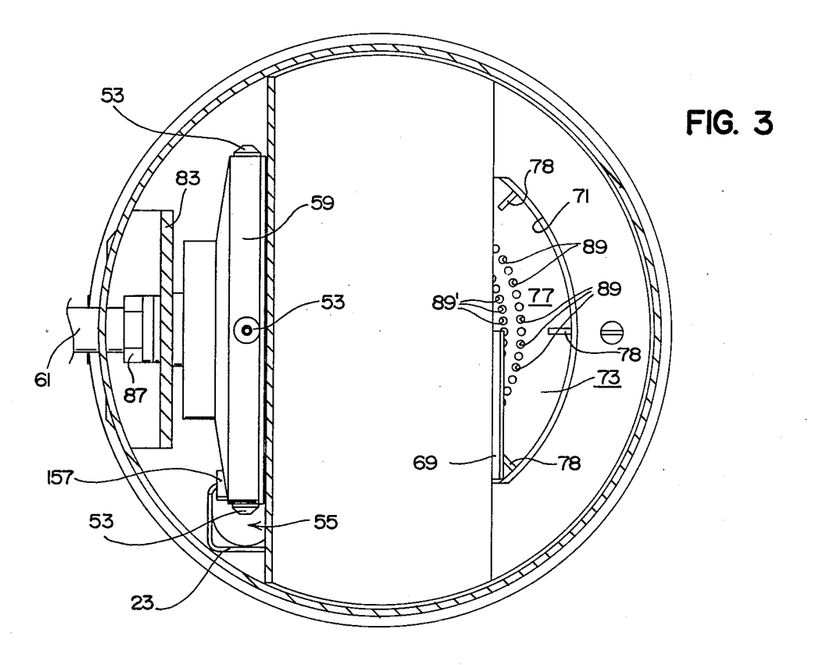
FIG. 3 is a sectional view taken as on the line III—III of FIG. 2 and which does not show any seeds.

From FIGS. 2 and 3 of the drawings it may clearly be seen that the means 49 for carrying the seedbed 45 through the seed pickup chamber 47 includes an annular continuous trough 73 rotatably driven about a vertical axis, as at 75, which may clearly be seen as interposed between the dispensing means 43 and the seed pickup chamber 47, in a manner to be more fully disclosed as the specification proceeds. Additionally, the annular trough 73 includes a horizontally disposed annular bottom 77 with the seedbed 45 being restingly supported thereon.

Further, the annular trough 73 includes a plurality of bladelike seed driving cleats 78 for assuring positive slip-free movement of the seedbed 45 as the trough 73 is rotated. From FIG. 2 of the drawing it may clearly be seen that the cleats 78 protrude upwardly from the annular bottom 77 and are preferably disposed adjacent the outer circumferential periphery thereof and are suitably attached thereto, e.g., as being integrally formed therewith. From FIG. 3 of the drawings it may clearly be seen that the cleats 78 are suitably spaced one from the other, i.e., the spaced intervals between adjacent cleats 78 may be conveniently determined. However, it will be understood that the cleats 78 are distributed over the entire trough 73, i.e., only a portion of the trough is visible in FIG. 3. Conversely, the cleats 78 may be deleted in their entirety from the trough 73 without departing from the spirit and scope of the present invention.

It should be mentioned at this time that the hollow wheel 59 is disposed a predetermined distance above the annular bottom 77 with the predetermined distance having a direct relationship with the thickness of the seedbed 45. Additionally, the horizontal shaft 61 is hollow or tubular as best shown in FIG. 5 of the drawings, i.e., the hollow interior of the shaft 61 being character referenced by the numeral 79. Accordingly, the respective hollow interiors 63, 79 of the wheel 59 and the tubular shaft 61 are communicated one with the other and with the suction pump 29 creates a vacuum within the wheel 59 in the manner as previously described.

The seed planter 11 preferably includes means, as at 81 in FIG. 4, selectively varying the spaced distance between the annular bottom 77 and the wheel 59 thus achieving an optimum relationship of the nozzle means 53 with the expanded seedbed 45' for various different thicknesses of the stable seedbed 45. More specifically, the means 81 for selectively varying the spaced distance between the bottom 77 and the wheel 59 includes means for slidably adjusting the horizontal shaft 61 along a vertical plane. More specifically, shaft 61 is supported by a vertically disposed platelike member 83 as best shown in FIGS. 2–4 of the drawings. The platelike member 83 is provided with an elongated vertically extending aperture 85 with the shaft 61 extending therethrough and being free to slide up and down along the length of the aperture 85. Suitable attachment means, e.g., a lock nut as at 85, is included for fixedly positioning the shaft 61 at any one of infinite positions along the length of the aperture 85 thus achieving an optimum relationship of nozzle means 53 with the expanded seedbed 45' for various different thickness of the stable seedbed 45. Here again, the optimum relationship of the nozzle means 53 is determined through experimentation to establish preselected standards which will be included as operating instructions accompanying the seed planter 11 but not included herewith.

The means 65 (FIG. 2) for communicating the seed pickup chamber 47 with the source of air pressure 35 preferably includes providing the annular bottom 77 with a continuous series of apertures 89, as best shown in FIGS. 2 and 3 of the drawings, which pass in succession through the seed pickup chamber 47 as the trough 73 rotates in a manner previously described. The apertures 89 respectively are smaller than the seeds 41 intended to be planted thus preventing passage of the seeds 41 therethrough. Additionally, the seed pickup chamber 47 is defined in part by a floor 91 (FIG. 2) having at least one orifice, as at 93, provided therein. From FIG. 2 of the drawings it may also be seen that the orifice 93 is disposed so as to become aligned successively with each of the apertures 89 as the annular trough 73 is being carried through the seed pickup chamber 47. The orifice 93 is communicated with the source of air under pressure 35 whereby the blast of air emanates upwardly through the orifice 93 and the series of apertures 89 which is effective to slightly lift and separate the seeds 41 being carried through the trough 73 thus an unstable or fluidal state exists within the seedbed 45' as it passes through the seed pickup chamber 47. It should be pointed out that it may be desirable to provide a second orifice, as at 93', and a second series of apertures, as at 80', which successively become aligned therewith as indicated in FIG. 2 of the drawings. Also, it may be desirable to stagger the individual apertures 89 with respect to the apertures 89'.

The seed planter 11 also includes synchronous means, e.g., a pair of bevel gears 95, 97, as shown in FIG. 2 of the drawings. The gears 95, 97 are coupled to the drive means 37 for carrying the seedbed 45 through the seed pickup chamber 47 at precisely the same velocity as the nozzle means 53 is being moved therethrough whereby the relative motion between the moving nozzle 53 and the moving seedbed 45 as they pass through the seed pickup chamber 47 is substantially nil. More specifically, the means 49 for carrying the seedbed 45 through the seed pickup chamber 47 includes the bevel gear 97 which is journaled to suitable frame structure, as at 99, by a bearing 101 for rotation about the vertical axis 75. The bevel gear 97 is coupled to the drive means 37 or more specifically the shaft 27 thereof by suitable coupling structure, as at 103. Accordingly, the number of teeth for the bevel gears 95, 97 are predetermined to closely synchronize the velocity of the trough 73 with the velocity of the nozzle means 53 in a manner well known to those skilled in the art. It should be understood that the abovementioned term "substantially nil" means there may be some variation in the relative motion without departing from the spirit of the present invention.

From FIG. 2 of the drawings it may also be seen that the hollow wheel 59 rotates about the shaft 61, i.e., the shaft 61 being stationary or fixedly attached to the platelike member 83 by the lock nut 87 as previously described. The seed planter 11 includes single point lip seal means, as at 105, for achieving and maintaining the vacuum created within the rotating wheel 59, i.e., the single point lip seal means 105 sealably engages an intermediate portion, as at 107, of the tubular shaft 61 and the hub portion, as at 109, of the wheel 59. It should be understood that the intermediate portion 107 of the shaft 61 preferably is an enlarged diameter portion of the shaft 61 and includes a lug portion 111 which extends into the elongated aperture 85 thus aiding in preventing rotation of the shaft 61. The intermediate portion 107 may optionally be in the form of a sleeve which sealably engages the circumferential portion of the shaft 61, i.e., the sleeve being splined to the shaft 61 in a conventional fashion. Accordingly, the wheel 59 is journaled to the shaft 61 by a bearing 113 which rests against the intermediate portion 107 and a snap ring 115 disposed within a groove provided in the wheel 59. Additionally, the bearing 113 is held in place by suitable structure including a lock washer 117 and a lock nut 119. If desirable, the bearing 113 may be of the well known seal type which would, of course, obviate the need for the lip seal 105 as a separate entity.

The seed planter 11 also includes cap means 121 as shown in FIG. 2 of the drawings for sealably enclosing the outer end of the tubular shaft, i.e., the lock nut 119 being attached to the outer end of the shaft 61. The cap means 121 is removably and sealably attached to the wheel 59 for rotation therewith. More specifically, the cap means 121 is preferably in the form of the bevel gear 95 which (being driven by the bevel gear 97) functions to rotatably drive the wheel 59. It should be understood that the bevel gear 95 includes a peripheral flange portion 123 (FIG. 2) which contiguously engages a planar face portion 124 (FIG. 59 of the wheel 59. The flange portion 123 is removably attached to the face portion 124 by a plurality of bolts 126 or the like.

Particular attention is now directed toward FIGS. 4 and 5 of the drawings wherein it may be seen that the means 57 for releasing the seeds 41 from the nozzle means 53 includes primary release means, as at 125 (FIG. 5) and secondary release means, as at 127 (FIG. 4). The primary release means 125 includes a blocklike member 129 slidably engaging a circular interior wall 131 defining in part the interior 63 of the hollow wheel 59 and is suitably disposed for cyclic occlusion with the nozzle means 53. The blocklike member 129 is preferably held in place by an anchor member 133 circumposed about the shaft 61 and having a pair of guide pins 135, 137 fixedly attached thereto, i.e., the blocklike member 129 being provided with bores 139, 141 for respectively slidably receiving the pins 135, 137. A floating pin 143 is slidably received in apertures 145, 147 respectively provided in the anchor member 133 and the tubular shaft 61, i.e., the aperture 147 being clearly shown in FIG. 2 of the drawings. The blocklike member 129 is provided with a bore 149 of suitable diameter for slidably receiving an enlarged portion, as at 151, of the floating pin 143. One end of a compression spring 153 rests against the bottom of the bore 149 while the other end thereof rests against the enlarged portion 151 of the floating pin 143, thus the pin 143 is urged into the apertures 145, 147 locking the anchor member 133 to the shaft 61 and simultaneously urging the blocklike member 129 against the circular interior wall 131 as clearly shown in FIG. 5 of the drawings. It should be understood that the spring 153 circumferentially engages an aft portion, as at 155 of the floating pin 143. In other words, the compression spring means 153 yieldably urges the blocklike member 129 sealably against the wheel 59 whereby the nozzle means 53 is cyclically isolated from the suction pump 29 as the wheel 59 rotates thus releasing the seed 41′ as it enters the seed discharge zone 55.

The secondary release means 127 (FIG. 4) includes wiper means 157 fixedly disposed within the seed discharge zone 55 for wiping and/or shearing engagement with the nozzle means 53 as the wheel 59 rotates thus achieving a certain degree of dislodging action with broken seeds or foreign objects which may be lodged in the nozzle 53. More specifically, each nozzle 53 has its outer surface wiped each revolution with fairly strong pressure by the wiper means 157 which preferably is constructed from elastomeric material of sufficient hardness so as to either shear off or shove through any object lodged in the nozzle 53. Accordingly, if the object is sheared off sufficient pressure exists in the suction pump 29 to pull it through and thus clear the nozzle 53. On the other hand, large objects merely covering the port will be cleared by the wipe means 157. The wiper means 157 is fixedly attached to an upper extension of the drop tube 23 by any suitable means, e.g., bolt and nut structure as at 159.

From FIG. 6 of the drawings it may clearly be seen that the nozzle means 53 includes self-clearing means, as at 161, for achieving a further degree of dislodging action with broken seeds or foreign objects which may become lodged therein. More specifically, the self-clearing means 161 includes providing the nozzle means 53 with a longitudinally extending bore 163 having a cross-sectional dimension which exceeds the cross-sectional dimension of the seeds 41 intended to be planted with the bore extending substantially the length of the nozzle means 53. The nozzle means 53 terminates outwardly thereof with means 165 defining a port 166 having a diameter which is exceeded by the diameter of the bore 163. The means 165 defining the port 166 is relatively thin to minimize the gripping action thereof upon and remnants of the lodged broken seeds or foreign objects resulting from the shearing and/or wiping action of the wiper means 157.

Stated another way, the means 165 defining the port 166 includes a convex nozzle face 167 having the port 166 centrally disposed therein and including a minute annular flat portion 169, i.e., the annular flat portion 169 in actuality defining the port 166. The area of the convex nozzle face 167 which extends outwardly from the flat portion 169 is flared back away from the flat portion 169 as clearly shown in FIG. 6 of the drawings to minimize the area of the flat portion 169 thus enhancing the ability of the nozzle means 53 to sealably engage seeds 41 having irregular shapes thereto.

The nozzle 53 as above described provides maximum holding power for positive gripping action of the seeds 41′ with a minimum of vacuum pressure being required. It will be appreciated by those skilled in the art that the ideal situation would be for the seed 41′ to completely block the port 166 to which it is being held. To the extent that this is not done, holding power is commensurately reduced. Seeds, selected at random, at best are irregular spheroids and at worst may even have convoluted surfaces making good contact between seed 41′ and port 166 difficult. The nozzle 53 as herein described overcomes this problem.

Further, it should be mentioned that the diameter of the port 166 should be as small as possible and still result in sufficient pressure differential to hold the seed 41' in place. Accordingly, a diameter of approximately 0.080 inches or 2,032 mm. in the case of field corn; or 0.031 inches in diameter or 0.79 mm. in the case of sugar beets, is preferred for the port 166. The reason for the small diameter of the part 166 is because there is a greater likelihood of finding a small regular area on the seed surface than there is a large similar area. For this same reason, the area of the flat portion 169 is kept to a minimum as previously mentioned. This enables the nozzle 53 to pick up not only spheroids but may even allow the nozzle 53 to attach to a seed 41' in a concave section of a convoluted surface. This is most unusual and is not possible with prior devices which have a flat surface of considerable area surrounding the port or which have larger diameter ports.

It should also be mentioned that a suitable pressure within the wheel 59 is between 5-10 inches of mercury or 127-254 mm. of mercury below atmospheric pressure.

It will also be appreciated by those skilled in the art that the new and inventive concepts as above described for the nozzle 53 in particular were not possible heretofore since the prior nozzles dipped into the seedbed and the wiping action of the adjacent seeds was sufficient to wipe the properly engaged seeds from the nozzle as it moved through the seedbed. Therefore, in these prior devices it was imperative that the ports be large in order to develop the necessary holding to minimize the wiping effect. In other words, the size of the ports in prior nozzles tended toward approximately the size of the seeds intended to be planted. Also, greater vacuum pressure was required to prior devices to aid in minimizing this wiping effect. Further, in order for the seed to completely block the port of these prior devices it would be necessary that the seeds have a reasonably uniform size and shape. As previously mentioned, such seed is available but at cost premiums varying directly with size consistency. Therefore, the same shortcomings for prior vacuum wheel seed planters are somewhat the same as those for the older plate type seed planters.

It should be understood that while only three nozzle means 53 are shown in FIG. 5 in conjunction with the wheel 59, it is anticipated that numerous nozzle means 53 may be added thereto without departing from the spirit and scope of the invention. Additionally, the wheel 59 is shown with the nozzle means 53 extending outwardly from the circumference thereof and is rotated about a horizontally disposed axis. However, it will be appreciated by those skilled in the art that a disc rotated about a vertical axis having the nozzle means 53 downwardly directed and attached to the face thereof can be adapted to operate in the same manner as herein disclosed for the wheel 59.

Although the invention has been described and illustrated with respect to a preferred embodiment thereof, it is to be understood that it is not to be so limited since changes and modifications may be made therein which are within the full intended scope of the invention.

We claim:

1. In a seed planter of the type incorporating a suction pump in conjunction with the seed pickup mechanism and having ground engaging drive means operable by pulling the seed planter along over the ground, and a hopper for containing a given supply of the seeds intended to be planted; the improvement which comprises dispensing means for dispensing from said hopper a layer of the seeds thus establishing a stable seedbed having a predetermined thickness, a seed pickup chamber disposed adjacent said dispensing means, means coupled to said ground engaging drive means for carrying said seedbed through said seed pickup chamber, said means for carrying said seedbed through said seed pickup chamber including an annular continuous trough rotatably driven about a vertical axis interposed between said dispensing means and said seed pickup chamber, said trough having an annular bottom with said seedbed being restingly supported thereon, means for expanding said seedbed whereby the density of said seedbed is decreased resulting in an increased thickness of said seedbed while it passes through said seed pickup chamber, said means for expanding said seedbed including a source of air under pressure and including means for communicating said seed pickup chamber with said source of air under pressure which is effective to slightly lift and separate the seeds whereby an unstable or fluidal state exists within said seedbed as it passes through said seed pickup chamber, said seed pickup mechanism including at least one nozzle means coupled to said ground engaging drive means and being communicated with said suction pump for repeatedly withdrawing one seed at a time from said expanded seedbed, said nozzle means being cyclically moved into said seed pickup chamber at a spaced distance above said stable seedbed thence to a seed discharge zone, and means for releasing the seeds from said nozzle means as said nozzle means enters said seed discharge zone thus enabling the seeds to subsequently gravitate to the ground at predetermined spaced apart intervals.

2. The seed planter as set forth in claim 1 in which said seed pickup mechanism includes a hollow wheel disposed a predetermined distance above said annular bottom of said trough with said wheel being rotatably driven about a horizontally disposed tubular shaft, said nozzle means being directed outwardly from the circumference of said wheel and being fixedly attached thereto for said movement into said seed pickup chamber thence to said seed discharge zone as said wheel rotates, the hollow interiors of said wheel and tubular shaft being communicated one with the other and with said suction pump whereby the air being moved by said suction pump creates a vacuum within said wheel with the air rushing inwardly through said nozzle means thus effecting the seed withdrawal by causing one of the seeds to be pulled firmly against said nozzle means.

3. The seed planter as set forth in claim 2 in which is included means for selectively varying the thickness of said static seedbed whereby an optimum stable thickness thereof may be obtained for various different type, size and weight of seeds.

4. The seed planter as set forth in claim 3 in which is included means for selectively varying the spaced distance between said annular bottom of said trough and said wheel thus achieving an optimum relationship of said nozzle means with the expanded seedbed for various different thicknesses of said stable seedbed.

5. The seed planter as set forth in claim 2 in which is included single point lip seal means for achieving and maintaining the vacuum created within said rotating wheel, said single point lip seal means sealably engaging an intermediate portion of said tubular shaft and the hub portion of said wheel.

6. The seed planter as set forth in claim 5 in which is included cap means for sealably enclosing the outer end of said tubular shaft, said cap means being removedly and sealably attached to said wheel for rotation therewith.

7. The seed planter as set forth in claim 6 in which said cap means is in the form of a bevel gear member also functioning to rotatably drive said wheel.

8. The seed planter as set forth in claim 1 in which said annular continuous trough includes a plurality of bladelike seed driving cleats for providing positive slip-free movement of said seedbed as said trough is rotated, said cleats extending upwardly from said annular bottom and being fixedly attached thereto.

9. In a seed planter of the type incorporating a suction pump in conjunction with the seed pickup mechanism and having ground engaging drive means operable by pulling the seed planter along over the ground, and a hopper for containing a given supply of the seeds intended to be planted; the improvement which comprises dispensing means for dispensing from said hopper a layer of the seeds thus establishing a stable seedbed having a predetermined thickness, a seed pickup chamber disposed adjacent said dispensing means, means coupled to said ground engaging drive means for carrying said seedbed through said seed pickup chamber, said means for carrying said seedbed through said seed pickup chamber including an annular continuous trough rotatably driven about a vertical axis interposed between said dispensing means and said seed pickup chamber, said trough having an annular bottom with said seedbed restingly supported thereon, means for expanding said seedbed whereby the density of said seedbed is decreased resulting in an increased thickness of said seedbed while it passes through said seed pickup chamber, said means for expanding said seedbed including a source of air under pressure, said annular bottom of said trough being provided with a continuous series of apertures which pass in succession through said seed pickup chamber, said apertures respectively being smaller than the seeds intended to be planted to prevent passage of the seeds therethrough, said seed pickup chamber being defined in part by a floor having at least one orifice provided therein, said orifice being disposed so as to become aligned successively with each of said apertures as said annular trough is being carried through said seed pickup chamber, and said orifice being communicated with said source of air under pressure whereby a blast of air emanates upwardly through said orifice and said series of apertures which is effective to slightly lift and separate the seeds being carried upon said trough thus an unstable or fluidal state exists within said seedbed as it passes through said seed pickup chamber, said seed pickup mechanism including at least one nozzle means coupled to said ground engaging drive means and being communicated with said suction pump for repeatedly withdrawing one seed at a time from said expanded seedbed, said nozzle means being cyclically moved into said seed pickup chamber at a spaced distance above said stable seedbed thence to a seed discharge zone, and means for releasing the seeds from said nozzle means as said nozzle means enters said seed discharge zone thus enabling the seeds to subsequently gravitate to the ground at predetermined spaced apart intervals.

10. In a seed planter of the type incorporating a suction pump in conjunction with the seed pickup mechanism and having ground engaging drive means operable by pulling the seed planter along over the ground, and a hopper for containing a given supply of the seeds intended to be planted; the improvement which comprises dispensing means for dispensing from said hopper a layer of the seeds thus establishing a stable seedbed having a predetermined thickness, a seed pickup chamber disposed adjacent said dispensing means, means coupled to said ground engaging drive means for carrying said seedbed through said seed pickup chamber, means for expanding said seedbed whereby the density of said seedbed is decreased resulting in an increased thickness of said seedbed while it passes through said seed pickup chamber, said means for expanding said seedbed including a source of air under pressure and including means for communicating said seed pickup chamber with said source of air under pressure which is effective to slightly lift and separate the seeds whereby an unstable or fluidal state exists within said seedbed as it passes through said seed pickup chamber, said seed pickup mechanism including at least one nozzle means coupled to said ground engaging drive means and being communicated with said suction pump for repeatedly withdrawing one seed at a time from said expanded seedbed, said nozzle means being cyclically moved into said seed pickup chamber at a spaced distance above said stable seedbed thence to a seed discharge zone, said seed pickup mechanism including a hollow wheel rotatably driven about a horizontally disposed shaft, said nozzle means being directed outwardly from the circumference of said wheel and being fixedly attached thereto for said movement into said seed pickup chamber thence to said seed discharge zone as wheel rotates, the hollow interior of said wheel being communicated with said nozzle means and said suction pump whereby the air being moved by said suction pump rushes inwardly through said nozzle means thus effecting the seed withdrawal by causing one of the seeds to be pulled firmly against said nozzle means, and means for releasing the seeds from said nozzle means as said nozzle means enters said seed discharge zone thus enabling the seeds to subsequently gravitate to the ground at predetermined spaced apart intervals, said means for releasing the seeds from said nozzle means as said nozzle means enters said seed discharge zone including primary and secondary release means, said primary release means including a blocklike member slidably engaging the interior of said hollow wheel and being disposed for cyclic occlusion with said nozzle means, and compression spring means for yieldably urging said blocklike member sealably against said wheel whereby said nozzle means is cyclically isolated from said suction pump as said wheel rotates thus releasing the seed.

11. Seed pickup mechanism for a vacuum wheel type seed planter, said seed pickup mechanism comprising means for arranging the seeds intended to be planted into a relatively thin layer thus establishing a stable seedbed; a seed pickup chamber defined in part by a floor having at least one orifice provided therein; means for carrying said seedbed through said seed pickup chamber at a spaced distance below the vacuum wheel, said means for carrying said seedbed through said seed pickup chamber including an annular continguous trough rotatably driven about a vertical axis interposed between said dispensing means and said seed pickup chamber, said trough having an annular bottom with said seedbed restingly supported thereon, said annular bottom of said trough being provided with a continuous series of apertures which pass in succession through said seed pickup chamber, said apertures respectively being smaller than the seeds intended to be planted to prevent passage of the seeds therethrough, said at least one orifice in said floor of said pickup chamber being disposed so as to become aligned successively with each of said apertures as said annular trough is being carried through said seed pickup chamber; and means for expanding said seedbed whereby the density of said seedbed is decreased resulting in an increased thickness of said seedbed while it passes through said seed pickup chamber thus lifting the seeds upwardly for engagement with the vacuum wheel, said means for expanding said seedbed including a source of air under pressure commmunicated with said at least one orifice in said floor of said pickup chamber whereby a blast of air emanates upwardly through said orifices and said series of apertures which is effective to slightly lift and separate the seeds being carried upon said trough thus an unstable or fluidal state exists within said seedbed as it passes through said seed pickup chamber.

\* \* \* \* \*